Figure 1:
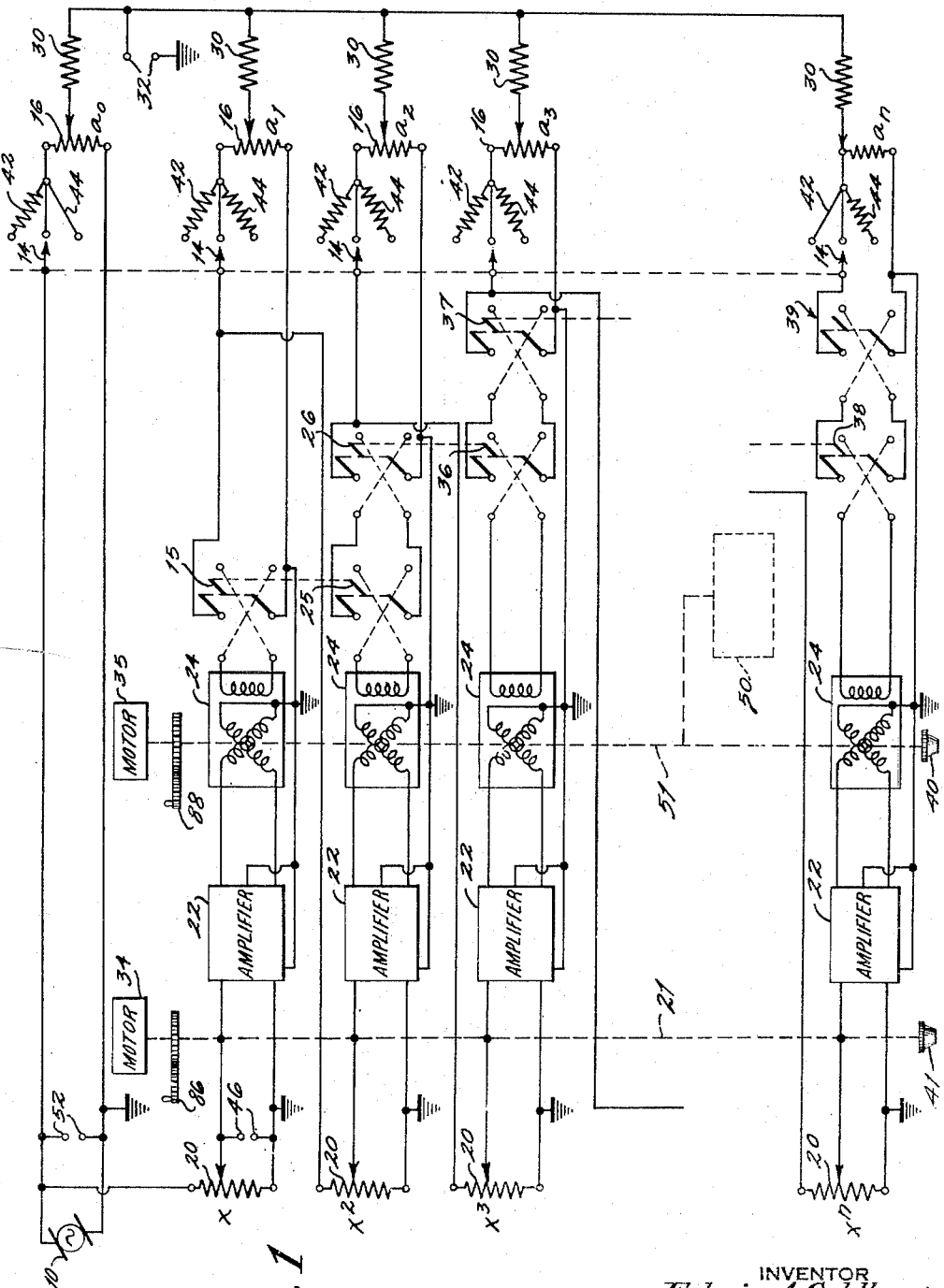

Patented June 26, 1951

2,558,430

UNITED STATES PATENT OFFICE 2,558,430

POLYNOMIAL EQUATION SOLVER

Edwin A. Goldberg, Princeton Junction, N. J., assignor to Radio Corporation of America, a corporation of Delaware Application July 30, 1949, Serial No. 107,814

10 Claims. (Cl. 235—61)

This invention relates to electrical computers, and more specifically to an improvement in electrical computers of the type which are used in solving polynomial equations.

Electrical computers of the voltage dividing and balancing type heretofore used in solving polynomial equations having the general form $$a_0 + a_1 x + a_2 x^2 + \ldots a_n x^n = 0$$

required the use of non-linearly wound potentiometers. The complexity of the winding tapers required was generally determined by $nx^n$, or the degree of the equation. Furthermore, numerous and tedious adjustments of computer dials were required after the polynomial equation was set up on the computer in order to obtain a balance and thereby obtain the roots of the equation. Operation of the prior art computers was not simple and would usually require trained personnel. No general indication of the approximate locations and values of the roots of the equation was provided. Each of the roots of the polynomial equation would be sought for by a successive balancing procedure.

It is an object of my present invention to provide an improved electrical computer for the solution of polynomial equations which is simpler to operate than such computers which are known to the prior art.

It is a further object of my present invention to provide an improved electrical computer for the solution of polynomial equations which indicates the approximate locations and values of the roots of the equation.

It is still a further object of my present invention to provide an improved electrical computer for the solution of polynomial equations which requires only substantially linearly wound potentiometers.

These and other objects of my invention are achieved by connecting a voltage source to a plurality of channels which are interconnected in series. The number of channels required depends on the degree of the equation being solved. Each channel essentially comprises a linear potentiometer and a phase shifting network consisting of a quadrature phase splitting amplifier and a phase shifter. The potentiometer shafts are all ganged together to provide identical attenuation ratios for each potentiometer at all times. The phase shifter rotors are also all ganged together to provide identical angles of phase shift $\theta$ for each phase shifter at all times. Coefficient potentiometers are provided and are coupled to each of the points at which the seriesed channels are interconnected. An $a_0$ coefficient potentiometer is connected to the voltage source. The outputs from all the coefficient potentiometers are summed up and applied to two cathode ray tube indicators. One of them merely indicates by a horizontal line when the sum voltage is zero. The second is arranged to fluoresce only when the sum voltage is zero. The beam is also deflected along the horizontal and vertical axes of the second cathode ray tube by respective voltages proportionate to $x \cos \theta$ and $x \sin \theta$. Thus, the second cathode ray tube indicates the location (amplitude and angle) of all real and imaginary roots of the polynomial equation. Each channel raises the voltage input to the next higher exponential power and shifts this voltage input by an additional angle $\theta$. The coefficient potentiometers which are associated with the respective channels are preset to the value indicated in the equation being solved and multiply the outputs from the associated channels accordingly. The linear potentiometers and the phase shifters are operated by means of their ganged shafts until the summation voltage is zero, as indicated on the two cathode ray tube oscilloscopes, and the values of $x$ and $\theta$ are then read from calibrated dials respectively attached to the potentiometer and phase shifter ganging shafts.

Figure 2:
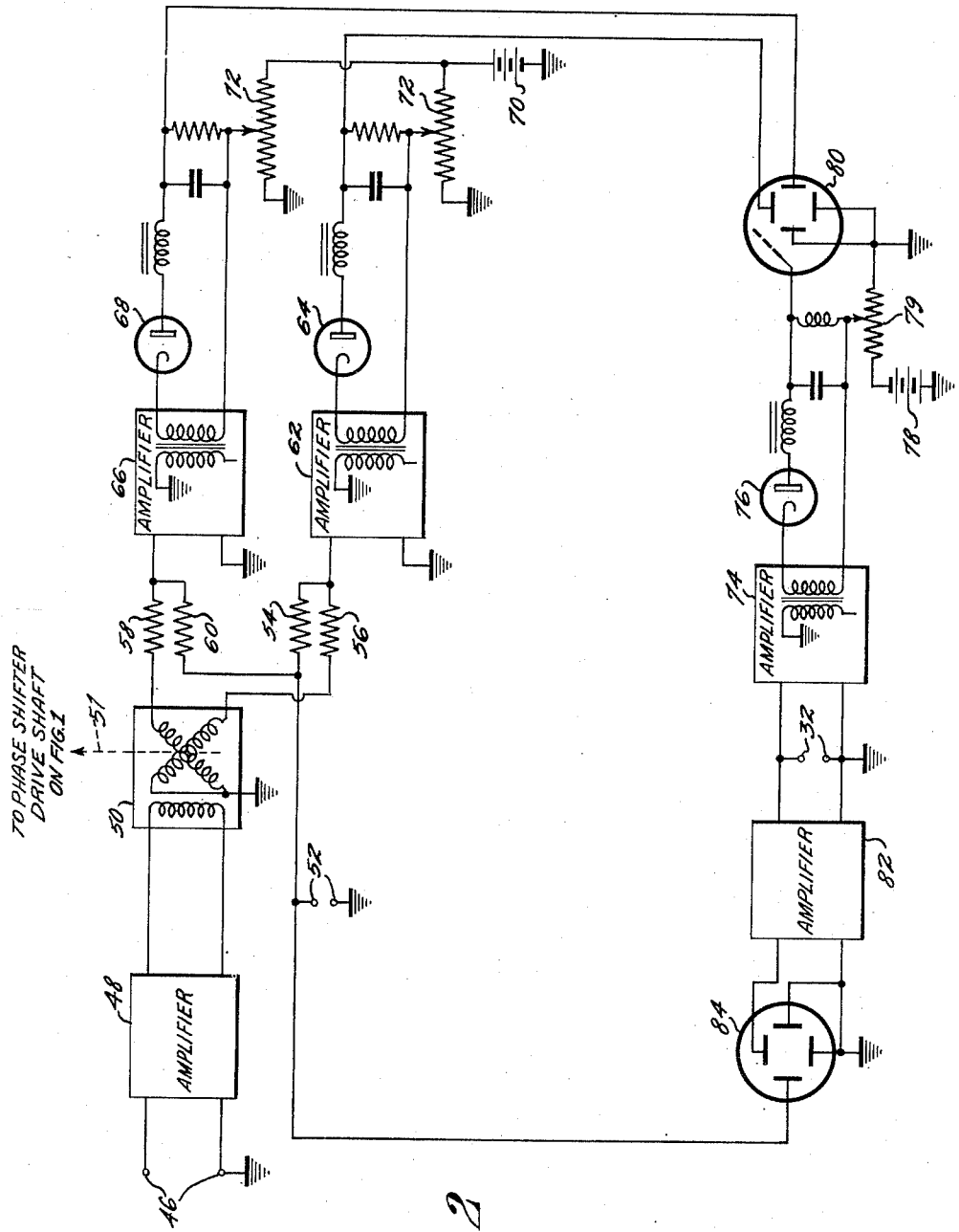

The novel features of my invention, as well as the invention itself, both as to its organization and method of operation, will best be understood from the following description, when read in connection with the accompanying drawings wherein similar functioning parts are similarly identified and wherein Fig. 1 is a schematic diagram of the computing section of my invention and, Fig. 2 is a schematic diagram of the indicating section of my invention.

Referring, now, to the schematic diagram of the computer section drawn in Fig. 1, it may be seen that the computer consists of an A. C. signal source 10 which supplies any desired unity voltage at the frequency at which the computer provides an optimum performance. This voltage is applied in parallel through a selector switch 14 to an $a_0$ coefficient potentiometer 16 and to the first of a sequence of series interconnected channels. The number of these channels is dependent upon the degree ($n$) of the polynomial equation being solved. These channels are designated as $x, x^2, x^3 \ldots x^n$.

Each channel consists of a linearly tapered potentiometer 20 the output from which is applied to an amplifier 22 whose gain is unity. In its output section, the amplifier 22, in well known fashion, divides its input into two voltage components 90 degrees out of phase. These quadrature components are used to excite the two phase rotor windings of a phase shifter 24. The output voltage of the phase shifter 24 passes through one polarity reversing switch 15 in the case of the $x$ channel, or first of the sequence of channels, and through two polarity reversing switches in all the other channels.

The output from the last polarity reversing switch 15, 26, 37 . . . of any one channel is applied to the linear potentiometer 20 of the next channel. Also connected to the outputs from the last polarity reversing switches in the respective channels $x$, $x^2$, $x^3$ . . . $x^n$ are the selector switches 14 in series with associated $a_1$, $a_2$, $a_3$ . . . $a_n$ coefficient potentiometers 16. Each coefficient potentiometer 16 has a summing resistor 30 connected to its output. The summing resistors 30 are all connected together and the resultant voltage is brought out to terminals 32.

The movable arms of all the linear potentiometers 20 in all the channels are ganged together by a shaft 21 so that they each simultaneously provide substantially the same resistance ratio and therefore substantially the same output voltage ratio at all times. The rotors of all the phase shifters 24 in all the channels are also all ganged together by a shaft 51 so that they each simultaneously provide substantially the same angle of phase shift. A motor 34 drives the linear potentiometer ganging shaft 21 and a motor 35 drives the phase shifter ganging shaft 51. The linear potentiometer ganging shaft also carries a dial 41 calibrated in values of $x$, and the phase shifter ganging shaft carries a dial 40 calibrated in values of $\theta$, the angle of phase shift.

For the purposes of explanation of the operation of my invention, let it be assumed that a voltage of unity is impressed on the first of a sequence of "$n$" series, interconnected, linear potentiometers. Let it be further assumed that all the movable arms of these potentiometers are ganged so that each potentiometer provides the same resistance ratio and, therefore, voltage output ratio at all times. Upon moving the shaft so that all the movable linear potentiometer arms are at their midpoints, the output voltage of the first potentiometer is 0.5, the second is 0.25, the third 0.125, and the $n$th potentiometer is $0.5^n$. Therefore, if the voltage output of the first linear potentiometer is $x$, the voltage output of the second linear potentiometer is $x^2$, the third is $x^3$, and the $n$th is $x^n$. If a coefficient potentiometer is connected to the voltage source, the output of each of these series interconnected potentiometers is applied to an associated coefficient potentiometer, and the outputs of all of these coefficient potentiometers are summed up or combined. There is thus provided an apparatus for solving the real roots of a polynomial equation of the type $$a_0 + a_1 x + a_2 x^2 + a_3 x^3 \ldots a_n x^n = 0$$

By setting the resistance ratio of the various coefficient potentiometers in accordance with the values indicated in the polynomial equation, being sure that coefficient potentiometer being set is associated with the linear potentiometer of the proper degree of $x$ and by revolving the linear potentiometer ganging shaft until the sum of all the coefficient potentiometer output voltages is zero, the real roots of the equation are obtained from the settings of the linear potentiometer arms at which this occurs. Essentially, this is the operation of my invention.

In each of the channels of a computer according to my invention, I have introduced the phase shifter 24 so that my computer solves for both the real and imaginary or complex roots of a polynomial equation. The output voltage $x$ from the linear potentiometer 20 in the $x$ channel is converted to $x\theta$ by the phase shifter 24. The output voltage from the $a_1$ potentiometer is therefore $a_1 x /\theta$. The output voltage from the linear potentiometer 20 in the $x^2$ channel is therefore $x^2 /\theta$. The output voltage from the phase shifter 24 in the $x^2$ channel, by virtue of the phase shifter ganging shaft, is $x^2 /2\theta$. The output voltage from the $a_2$ potentiometer 16 is $a_2 x^2 /2\theta$. Finally, in the $x^n$ channel, the linear potentiometer 20 output is $x^n/(n-1)\theta$, the output from the phase shifter 24 in the $x^n$ channel is $x^n/n\theta$ and the output of the $a_n$ potentiometer 16 is $a_n x^n/n\theta$.

The signs of the coefficients of a polynomial equation are provided for in the computer of my invention by means of ganged polarity reversing switches. Ganged polarity reversing switches 15 and 25 determine the sign of the $a_1$ potentiometer, ganged switches 26 and 36 determine the sign of the $a_2$ potentiometer, etc. In the $n$th channel, the sign of the $a_n$ potentiometer is determined by polarity reversing switch 39. If the coefficient $a_1$ is negative, then, by throwing ganged switches 15 and 25 in one direction or the other the polarity of the voltage input to the $a_1$ potentiometer is reversed and the output from the $a_1$ potentiometer is therefore negative. As a result, the output from the phase shifter is also negative, but this is compensated for by ganged switch 25 which, by reason of the ganging connection, is in position to reverse the polarity of its input. Therefore, the polarity of the input to the $a_2$ potentiometer is positive. In this manner, the polarity of the input to any one of the coefficient potentiometers is determined and, thereby, the sign of the output from the potentiometer. Similarly, by throwing ganged switches 26, 36 in one direction or the other, the polarity input to the $a_2$ potentiometer is made negative, if required. If $a_0$ is negative, then the entire polynomial equation is multiplied by $(-1)$ and the respective ganged switches are then operated as indicated by the resultant signs of the coefficients of the polynomial equation.

The ganged selector switches 14 and their associated resistors provide a means for extending the range of the values of the variable $x$ which may be obtained with this computer. The gain of a channel consisting of a linear potentiometer 20, amplifier 22 and phase shifter 24, with the potentiometer set at its maximum value, should, for convenience, be unity. With the ganged selector switches 14 set in their upper position, the maximum value of the $x$ potentiometer may be made to equal ten, instead of unity, if a selector switch 14 is connected to its associated coefficient potentiometer 16 through a resistor 42 whose value is determined by $(10^{n-s}-1) R_{a_s}$ where $n$ is the degree of the polynomial equation, $s$ is the subscript of the coefficient potentiometer 16 with which the selector switch 14 is associated, $R_{a_s}$ is the resistance of the associated coefficient potentiometer 16, and the equation being solved is of the form $$a_0 + a_1 x + a_2 x^2 + a_3 x^3 + \ldots a_n x^n = 0$$

As a more specific illustration, let it be assumed that an equation where $n$ equals three is being solved and it is wished to extend the range of $x$ read on the dials from unity to ten. Using the above formula to compute the value of the resistors, the resistance value of the resistor 42 for the $a_3$ potentiometer 16 is zero, or the selector switch 14 connects directly to the $a_3$ potentiometer 16. The value of the resistor 42 for the $a_2$ potentiometer is nine times the value of the resistor of the $a_2$ potentiometer 16. The value of the resistor 42 for the $a_1$ potentiometer is 99 times the value of the $a_1$ potentiometer, and the value of the resistor 42 for the $a_0$ potentiometer is 999 times the value of the $a_0$ potentiometer. Therefore, the actual equation being solved is $$0.001a_0 + 0.01a_1x + 0.1a_2x^2 + a_3x^3 = 0$$

or $$a_0 + a_1(10x) + a_2(10x)^2 + a_3(10x)^3 = 0$$

and therefore the actual value of $x$ equals ten times the actual reading on the $x$ dial 41.

When the ganged selector switches 14 are thrown downward to the lowest position, the actual value of $x$ read on the dial 41 may be made to equal 0.1 times the actual dial reading by selecting the value of the resistors 44 connecting the respective selector switches 14 to the respective coefficient potentiometers 16 to equal the value obtained from the formula $$(10^s - 1)Ra_s$$

where $s$ is the subscript of the coefficient potentiometer with which the selector switch is associated, $Ra_s$ is the resistance of the associated coefficient potentiometer, and the equation being solved is of the form $$a_0 + a_1x + a_2x^2 + a_3x^3 + \ldots a_nx^n = 0$$

To illustrate this further, let it be assumed that an equation is being solved where $n$ equals 3 and it is wished to change the full scale range of the reading obtained on the dials from unity to one tenth. Using the above formula to compute the value of the resistors, the resistor 44 associated with the $a_0$ potentiometer is zero, or the switch 14 connects directly to the $a_0$ potentiometer 16. The resistor 44 for the $a_1$ potentiometer is 9 times the value of the $a_1$ potentiometer, the value of the resistor 44 for the $a_2$ potentiometer is 99 times the value of the $a_2$ potentiometer, and the value of the resistor 44 for the $a_3$ potentiometer is 999 times the value of the $a_3$ potentiometer. Therefore, the actual equation being solved is $$a_0 + 0.1a_1x^1 + 0.01a_2x^2 + 0.001a_3x^3 = 0$$

or $$a_0 + a_1(0.1x) + a_2(0.1x)^2 + a_3(0.1x)^3 = 0$$

or the actual value of $x$ is one tenth the reading on the $x$ dial.

In Fig. 2, there may be seen the schematic diagram for the indicator circuit for the computer. An "$x$" voltage, which is the output voltage at the potentiometer 20 in the $x$ channel, is taken from the terminals 46 (also shown in Fig. 1) and applied to the input of an amplifier 48 with a gain of unity. The output of the amplifier 48 excites the stator of an angle resolver 50 which is similar to the phase shifters 24 shown in Fig. 1 except that it is connected in reverse. The two phase rotor of the angle resolver 50 is ganged on the same shaft 51 as the shaft driving the phase shifters 24 in Fig. 1 and makes the same angle $\theta$ with its stator as do the rotors of the phase shifters 24 shown in Fig. 1. In view of its connections, however, the output voltages of the angle resolver are substantially $x \sin \theta$ and $x \cos \theta$.

A fixed reference phase and amplitude voltage is taken from the voltage source 10 through the terminals 52 (also shown on Fig. 1) and, by means of resistors 54, 56, is added to the $x \sin \theta$ voltage. This voltage is then amplified by means of the amplifier 62, rectified by the rectifier 64, added to a positive voltage obtained from a voltage source 70, and then connected to the vertical deflection control electrodes of a cathode ray tube 80. The $x \cos \theta$ voltage output from the angle resolver 50 is similarly added to the fixed reference phase voltage by means of resistors 58, 60, amplified by an amplifier 66, rectified by a rectifier 68, added to a positive voltage obtained from the voltage source 70, and applied to the horizontal deflection control electrodes of cathode ray tube 80.

The rectifiers 64, 68 are connected so that they pass only the negative portion of the amplified wave. Since positive bias is applied to the anodes of the rectifiers, the signals applied to the cathode ray tube oscilloscope deflection plates will fluctuate dependent upon the resultant input to the amplifier. For instance, if the A. C. phase of $x \cos \theta$ is the same as the phase of the signal source voltage to which it is added ($\theta = 0$), then the input to the amplifier is a maximum for a given value of $x$ and the horizontal deflection voltage is therefore a minimum. If $x \cos \theta$ is 180 degrees out of phase with the signal source voltage, then, for a given value of $x$, the input to the amplifier is a minimum and the horizontal deflection voltage is a maximum. The vertical deflection voltage will vary similarly. Therefore, the horizontal deflection voltage on the cathode ray tube will always be substantially proportional to $x \cos \theta$, the real part of the variable, and the vertical deflection is always proportional to $x \sin \theta$, the imaginary part of the variable. The bias adjusting potentiometers 72 are for the purpose of selecting the proper bias voltage values so that the system is properly responsive and will give deflection voltages on both sides of the cathode ray tube beam neutral point. Effectively, then, the potentiometers 72 act as vertical and horizontal centering controls.

The summation voltage which appears at terminals 32 (also shown in Fig. 1) is applied to the input of an amplifier 74. A rectifier 76 rectifies the amplifier output which is then applied to the intensity control electrode of the C. R. tube 80. A D. C. bias from a bias source 78 is simultaneously applied to the intensity control electrode and its value is adjusted by means of a bias potentiometer 79. The value of the D. C. bias is made such that in combination with any output from the amplifier the cathode ray beam is blanked off. Therefore a spot is seen on the cathode ray tube screen when there is substantially zero input to the amplifier 74. Thus, every time the summation voltage $$a_0 + a_1x + a_2x^2 + a_3x^3 \ldots a_nx^n = 0$$

a value of $x$ which satisfies the polynomial equation occurs, and its value is indicated by the location of a spot on the cathode ray tube screen.

The summation voltage is also applied from the terminals 32 to another amplifier 82. The output of this amplifier 82 is applied to the vertical deflection plates of a cathode ray tube 84. A portion of the A.-C. source voltage is applied from the terminals 52 to the horizontal deflection plates of the cathode ray tube 84. Thus, when the summation voltage is zero, this is indicated by a horizontal line on the cathode ray tube screen. Otherwise, the pattern on the screen will be a Lissajous figure.

In order to use the computer of my present invention to solve a polynominal equation, first, the coefficient potentiometers 16 are adjusted to have a ratio corresponding to their values in the equation to be solved. Next, the motors 34, 35 that drive the linear potentiometers 20, the phase shifters 24 and angle resolver 50 are started. One motor should be driven at a slow rate and the other at a rapid rate in order to cover an extremely wide range of the variable $x$. The values of $x$ which satisfy the equation are noted by the appearance of dots on the screen of the cathode ray tube 80. The motors are then stopped and the respective $x$ and $\theta$ ganged shafts are adjusted by hand to give a zero vertical deflection plates are supplied with the summation voltage. The roots of the equation are then read from the $x$ and $\theta$ dials 41, 40. Repeated roots may be determined from the presentation on the cathode ray tube 80 by slightly changing the coefficient potentiometer ratio of any one of the potentiometers 16. If, when this is done, one of the dots on the screen of the C. R. tube 80 becomes two, a repeated root of the value of the variable $x$ associated with that dot is present. The maximum value of each of the coefficient potentiometers 16 is considered as unity. A polynomial equation may be altered by division, in a manner well known to the art, so that all its coefficients are equal to unity or a fraction thereof.

From the foregoing description, it will be readily apparent that I have provided an improved electrical computer system or apparatus for the solution of polynomial equations which is simple to operate and presents all the roots of the equation visually so that they are obtained with a minimum of adjustment. It will also be apparent that the components of the computer are simple ones which are readily available and easily replaceable, when defective. In the foregoing description, the various voltage dividing means have been referred to as potentiometers. This is not to be taken as a limitation of the invention, since any specific type of linear voltage divider which does not shift the phase of the voltage may be used. It should be apparent that many changes may be made in the particular embodiment herein disclosed, and that many other embodiments are possible, all within the spirit and scope of my invention. For example, other types of null indicators may be used with the computer section shown in Fig. 1. Equipment for automatically stopping or slowing the speed of the motors of the computer in the vicinity of the null voltage may be actuated by the null voltage. Also, phase shifting networks may be used in place of the phase shifters. Furthermore, one motor with a variable speed gear box may be used to drive both the $x$ potentiometer and phase shifter shafts. Therefore, I desire that the foregoing description shall be taken as illustrative and not as limiting.

What is claimed is:

1. An electrical computer comprising a plurality of first potentiometric means ganged together for each of said first potentiometric means to simultaneously have a substantially similar attenuation ratio, a plurality of networks interposed between and interconnecting in series successive ones of said first potentiometric means, each of said networks comprising (1) a phase splitting amplifier connected to the output of an associated first potentiometric means and (2) phase shifting means coupled to said amplifier output and having its output coupled to a first potentiometric means following said associated first potentiometric means in said series, all of said phase shifting means being ganged together for each of said phase shifting means to simultaneously have a substantially similar phase shift angle, a plurality of second potentiometric means, each of said first potentiometric means being connected in parallel with a separate one of said second potentiometric means, a last one of said plurality of networks interposed between and connecting in series a last one of said series interconnected first potentiometric means with a last one of said plurality of second potentiometric means, and means to combine the outputs from each of said second potentiometric means.

2. An electrical computer as recited in claim 1 wherein each of said first potentiometric means comprises a potentiometer having a linearly wound taper.

3. An electrical computer as recited in claim 1 having, in addition, a null indicating means coupled to said means to combine said second potentiometric means outputs.

4. An electrical computer for determining the roots of polynomial equations of the type $$a_0 + a_1 x + a_2 x^2 + a_3 x^3 \ldots a_n x^n = 0$$

comprising a plurality of channels interconnected in series, and a plurality of series combinations, each of said plurality of series combinations comprising range extending means, a coefficient potentiometer having its input connected in series with said range extending means, and a summing resistor connected in series with the output of said coefficient potentiometer: a first one of said plurality of series combinations being connected in parallel with the input to the first one of said series connected channels, remaining ones of said plurality of series combinations being respectively connected to the points of series interconnection between said channels, the outputs from all said series combinations being connected in parallel to be combined, each of said plurality of channels comprising (1) a linearly tapered potentiometer, all of said potentiometers in said plurality of channels being ganged for each of said potentiometers to simultaneously have substantially the same resistance ratio, (2) a quadrature phase splitting amplifier coupled to the output of said linearly tapered potentiometer, (3) a variable phase shifter coupled to the output of said quadrature phase splitting amplifier, all of said variable phase shifters in said plurality of channels being ganged for each of said phase shifters to simultaneously have substantially the same phase shift angle, and (4) at least one polarity reversing switch coupled to the output of said phase shifter.

5. An electrical computer as recited in claim 4 wherein said range extending means comprises a multiposition selector switch, all the selector switches in said plurality of series combinations being ganged to permit a simultaneous change of positions, a first resistor connected to one of said selector switch positions having a value equal to $$(10^{n-s} - 1) R a_s$$

and a second resistor connected to another of said selector switch positions having a value equal to $$(10^n - 1) R a_s$$

where, $n$ is the degree of the polynomial equation, $s$ is the subscript of the coefficient potentiometer associated with said selector switch, and $R_{a_s}$ is the resistance of the coefficient potentiometer associated with said selector switch, whereby selecting said first resistor is equivalent to extending the range of said computer ten times unity and selecting said second resistor is equivalent to extending said computer range to one tenth of unity.

6. An electrical computer for obtaining the roots of a polynomial equation of the type $a_0+a_1x+a_2x^2+a_3x^3 \ldots +a_nx^n=0$ comprising a plurality ($n$) of channels interconnected in series, each of said channels comprising a linearly tapered potentiometer and variable phase shifting means in series with said linearly tapered potentiometer, each of the variable phase shifting means being ganged to simultaneously provide the same phase shift angle, a source of voltage connected to the first of said plurality of series interconnected channels, a plurality ($n+1$) of coefficient potentiometers, a first one of said plurality of coefficient potentiometers being connected to said source of voltage, each of the remaining ones of said plurality of coefficient potentiometers being separately coupled to the output from each of said channels, means to combine the outputs from all of said coefficient potentiometers, variable means coupled to the output of the linearly tapered potentiometer in said first of said plurality of series interconnected channels and ganged with said variable phase shifting means to resolve a received voltage into its quadrature components at the angle of phase shift of said variable phase shift means, a cathode ray tube having beam control electrodes, means to impress one of said quadrature components upon said beam control electrodes to deflect the beam along a horizontal axis, means to impress the other of said quadrature components upon said beam control electrodes to deflect the beam along a vertical axis, means to impress a cut-off bias upon said beam control electrodes to suppress said beam, and means coupled to said coefficient potentiometers, output combining means to overcome said cut-off bias and render said cathode ray tube indicating when the voltage received from said combining means is substantially zero, whereby said cathode ray tube indicates the roots of the polynomial equation.

7. An electrical computer as recited in claim 6 wherein each of said means to impress one of said quadrature components upon one of said beam control electrodes comprises a first resistor connected between the associated component output of said variable means to resolve a received voltage into its quadrature components and an amplifier, a second resistor connected between said source of voltages and said amplifier, means to rectify the output from said amplifier and bias means to oppose said rectified output.

8. An electrical computer as set forth in claim 6 having, in addition, a null indicator comprising an amplifier having its input coupled to said coefficient potentiometers output combining means, a cathode ray tube having beam control electrodes, the output from said amplifier being impressed on said beam control electrodes to deflect the beam of said cathode ray tube along a vertical axis, said voltage source being coupled to said beam control electrodes to deflect said beam along a horizontal axis whereby a null point in the output from said combining means may be detected.

9. An electrical computer comprising a plurality of first potentiometric means, network means interposed between and interconnecting in series each of said plurality of first potentiometric means, each one of said network means including quadrature phase splitting means, phase shifting means connected to the output of said quadrature phase splitting means, a plurality of second potentiometric means, each of said first potentiometric means being coupled in parallel with a separate one of said second potentiometric means, another network means connecting the last one in said series of first potentiometric means in series with one of said plurality of second potentiometric means, and means to combine the outputs from each of said second potentiometric means.

10. An electrical computer comprising a plurality of first potentiometric means, network means interposed between and interconnecting in series each of said plurality of first potentiometric means, each one of said network means including quadrature phase splitting means, phase shifting means connected to the output of said quadrature phase splitting means, at least one polarity reversing switch to which a portion of the output of said phase shifting means is applied, a plurality of second potentiometric means, each of said first potentiometric means being coupled in parallel with a separate one of said second potentiometric means, another network means connecting the last one in said series of first potentiometric means in series with one of said plurality of second potentiometric means, and means to combine the outputs from each of said second potentiometric means.

EDWIN A. GOLDBERG.

REFERENCES CITED

The following references are of record in the file of this patent:

"An Electro-Mechanical Method for Solving Equations," Schooley—RCA Review, vol. III—July 1938, No. 1, pages 86–96.

"An Electrical Algebraic Equation Solver," Herrand Graham—Rev. Sci. Inst., Oct. 1938, vol. 9, pages 310–315.

"Electronic Computers" — Shannon, "Electronics," August 1946, pages 110–113, inclusive.

"Analysis of Problems in Dynamics by Electronic Circuits," Ragazzini—IRE Proceeding, vol. 35, No. 5, May 1947, pages 444–452.

"Electronical Analogue Computing"—Mynall, "Electronic Engineering," June 1947, pages 178–180 inclusive; 214–217 inclusive.

"Electronic Instruments"—Greenwood et al., Radiation Laboratory Series, No. 21, McGraw-Hill Publication Co., April 20, 1948, pages 120–122.